(12) United States Patent
Ghessassi

(10) Patent No.: US 11,876,893 B2
(45) Date of Patent: *Jan. 16, 2024

(54) CACHING AND DELIVERING MEDIA CONTENT FROM MULTIPLE STREAMING PROVIDERS

(71) Applicant: Charter Communications Operating, LLC, St. Louis, MO (US)

(72) Inventor: Karim Ghessassi, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,128

(22) Filed: Sep. 10, 2022

(65) Prior Publication Data

US 2023/0006810 A1    Jan. 5, 2023

Related U.S. Application Data

(63) Continuation of application No. 17/029,001, filed on Sep. 22, 2020, now Pat. No. 11,444,750.

(51) Int. Cl.
| | |
|---|---|
| *G06F 9/54* | (2006.01) |
| *H04L 9/06* | (2006.01) |
| *H04L 65/60* | (2022.01) |
| *H04L 9/08* | (2006.01) |
| *H04L 67/568* | (2022.01) |
| *G06F 3/04842* | (2022.01) |

(52) U.S. Cl.
CPC .............. *H04L 9/065* (2013.01); *G06F 9/547* (2013.01); *H04L 9/0819* (2013.01); *H04L 65/60* (2013.01); *H04L 67/568* (2022.05); *G06F 3/04842* (2013.01)

(58) Field of Classification Search
CPC ....... H04L 9/065; H04L 9/0819; H04L 65/60; H04L 67/568; H04L 65/612; H04L 65/4061; H04L 65/1033; G06F 9/547; G06F 3/04842
See application file for complete search history.

(56) References Cited

U.S. PATENT DOCUMENTS

| | | | |
|---|---|---|---|
| 7,792,963 | B2 | 9/2010 | Gould et al. |
| 11,444,750 | B2 * | 9/2022 | Ghessassi ............. H04L 67/568 |
| 2001/0047516 | A1 | 11/2001 | Swain et al. |
| 2002/0078467 | A1 | 6/2002 | Rosin et al. |
| 2005/0149981 | A1 | 7/2005 | Augenbraun et al. |
| 2005/0289617 | A1 | 12/2005 | Safadi et al. |
| 2006/0130107 | A1 | 6/2006 | Gonder et al. |
| 2007/0217436 | A1 | 9/2007 | Markley et al. |
| 2009/0070842 | A1 | 3/2009 | Corson |
| 2009/0248794 | A1 | 10/2009 | Helms et al. |
| 2010/0313236 | A1 | 12/2010 | Straub |
| 2013/0219422 | A1 * | 8/2013 | Kambampati ... H04N 21/25866 725/48 |

(Continued)

*Primary Examiner* — Brian W Wathen
(74) *Attorney, Agent, or Firm* — Otterstedt & Kammer PLLC

(57) ABSTRACT

In a system and method for distribution of media content, a cable provider gateway cooperates with a broker API, one or more streaming provider gateways, and one or more streaming applications to locally cache and display media content from the streaming provider gateways even when the streaming applications do not have connectivity to their gateways.

11 Claims, 14 Drawing Sheets

(56) References Cited

U.S. PATENT DOCUMENTS

| | | |
|---|---|---|
| 2014/0082654 A1 | 3/2014 | van Coppenolle et al. |
| 2014/0115090 A1* | 4/2014 | Hasek .............. H04N 21/21815 |
| | | 709/213 |
| 2018/0176612 A1 | 6/2018 | Neufeld et al. |
| 2018/0275881 A1* | 9/2018 | Ashraf .................... G06F 3/065 |

* cited by examiner

CACHING AND DELIVERING MEDIA CONTENT FROM MULTIPLE STREAMING PROVIDERS

CROSS-REFERENCE TO RELATED APPLICATION

This application is a continuation, under 37 CFR 1.53(b), of co-assigned U.S. patent application Ser. No. 17/029,001 of first named inventor Karim Ghessassi, and claims the benefit thereof, said application Ser. No. 17/029,001 having been filed on 09-22-2020, and entitled "CACHING AND DELIVERING MEDIA CONTENT FROM MULTIPLE STREAMING PROVIDERS." The complete disclosure of the aforesaid application Ser. No. 17/029,001 is expressly incorporated herein by reference in its entirety for all purposes.

FIELD OF THE INVENTION

The present invention relates generally to media content delivery, and more particularly relates to continuous delivery of streaming video when a customer has limited internet connectivity.

BACKGROUND OF THE INVENTION

Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. There are also fiber networks for fiber to the home (FTTH) deployments (also known as fiber to the premises or FTTP, or as fiber to the curb or FTTC), where the consumer premises equipment (CPE) is a Service ONU (S-ONU; ONU=optical network unit).

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville CO 80027, USA, and may be referred to at some points herein in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

There is a strong trend of shift in how users prefer to consume video content. The trend is referred to as 'cable cutting' or 'cord cutting' and it mainly involves discontinuing service from traditional providers (cable, satellite, etc.). The alternative options for streaming services include Netflix® (registered trademark of Netflix, Inc. of Los Gatos, California), Hulu® and Disney+™ (trademarks of Disney, Inc. of Burbank, California), etc. These streaming services deliver video content via Internet (TCP/IP) and mainly play back the delivered video via non-proprietary devices running custom applications provided by each streaming service. While the term 'cable cutting' might imply discontinuing all services from the cable company, in fact, the term is not completely accurate. When a cable operator is providing Internet service to a customer, even when video service is not included, using any streaming service still typically involves the cable operator providing broadband data services for Internet connectivity. The shift to streaming services increases loads on the multi-system operator's (MSO's) Internet infrastructure. Principles of 'net neutrality' restrain the MSO from rationing service to the Streaming Providers. Accordingly, some operators impose total monthly data limits on the customer's usage (example: 1 TB per month). Additional fees are assessed if the user exceeds the monthly caps. The customer, in this case, is faced with a new limitation for how much content can be streamed, especially in an era where 'binge watching' is increasingly popular. The streaming applications tend to not have on-site caching (digital video recorder or DVR) capabilities, which limit their usage, especially when Internet connectivity is down.

Due to the nature of content streaming and content serving over the Internet, there is typically a capacity issue. Usage is increased dramatically within a relatively small window (for example, 6:00 PM-10:00 PM). This typically means that the content provider must allocate substantial resources for a short window, since the system users typically expect the quality of video to be high at all times.

SUMMARY OF THE INVENTION

Techniques are provided for caching and delivering media content from multiple streaming providers.

In one aspect, a broker Application Programming Interface (API) is implemented at a consumer premises equipment that includes a memory and a processor, connected in communication with a cable provider gateway, a first streaming provider gateway, a second streaming provider gateway, and a Local Area Network (LAN). The broker API receives, from a first streaming application implemented in the LAN, an encrypted request for first media content. The broker API retrieves, from the storage device, a first encrypted manifest of locally stored content. The broker API compares the encrypted request to the first encrypted manifest (the request and the first manifest both are encrypted by a first streaming key, which is known by the first streaming provider gateway and the first streaming application implemented in the LAN, but not known by the broker API, the second streaming provider gateway, the cable provider gateway, and a second streaming application). In response to a match between the encrypted request and the first encrypted manifest, the broker API retrieves, from the storage device, the first media content that is encrypted by the first streaming key. The broker API delivers the encrypted first media content to the first streaming application.

In another aspect, a streaming application implements a method for caching and delivering media content from multiple streaming providers. The streaming application receives a consumer selection of first content from a user via a first streaming application User Interface (UI), generates a first encrypted content selection by encrypting the consumer selection of first content using a first streaming key, and transmits the first encrypted content selection to a broker Application Programming Interface (API) that is implemented in a Local Area Network (LAN) in communication with the first streaming application; the broker API does not know the first streaming key. The streaming application receives, from the broker API, encrypted first content corresponding to the first encrypted content selection, and generates first content by decrypting the encrypted first content using the first streaming key. The first streaming application displays the first content to the user via the first streaming application UI.

According to another aspect, a streaming provider gateway implements a method for proactively delivering media content to a subscriber streaming application. The streaming provider gateway receives from the subscriber streaming application an encrypted selection of first media content to be consumed. The selection is encrypted by a first streaming key, which the streaming provider gateway and the subscriber streaming application know. The streaming provider gateway encrypts the first media content by the first streaming key. The streaming provider gateway pushes the encrypted first media content to a cable provider gateway ("back end") that does not know the first streaming key. The streaming provider gateway uses a recommendation engine to identify second media content corresponding to the first media content, and encrypts the second media content by the first streaming key. The streaming provider gateway pushes the encrypted second media content from the streaming provider gateway to the cable provider gateway before the subscriber streaming application requests it.

According to another aspect, a cable provider gateway and a broker API implement methods for locally storing and delivering encrypted content. The cable provider gateway receives a first diff file that is pushed from a first streaming provider gateway. The first diff file includes first content and an updated manifest that are encrypted by a first streaming key. The first streaming provider gateway and a first streaming application know the first streaming key but the cable provider gateway does not know the first streaming key. The cable provider gateway pushes the first diff file through a consumer premises equipment to local storage. The broker API receives an encrypted selection of media content from the first streaming application. The encrypted selection of media content is encrypted by the first streaming key, which the broker API does not know. The broker API matches the encrypted selection to the updated encrypted manifest in the local storage. The broker API retrieves the encrypted first content from the local storage in response to the encrypted selection. Then the broker API delivers the encrypted first content to the first streaming application via the LAN.

According to another aspect, a broker API and a streaming application implement methods for locally caching and displaying media content. The methods include implementing a broker Application Programming Interface (API) at a consumer premises equipment that includes a memory and a processor, connected in communication with a cable provider gateway, a first streaming provider gateway, a second streaming provider gateway, and a Local Area Network (LAN), and implementing a streaming application in the LAN. The broker API retrieves from the storage device a first encrypted manifest of locally stored content, which is encrypted using a first streaming key. The first streaming application receives a consumer selection of first content from a user via a first streaming application User Interface (UI), generates a first encrypted request by encrypting the consumer selection of first content using the first streaming key, and transmits the first encrypted request to the broker API. The broker API does not know the first streaming key. The broker API receives the first encrypted request. The broker API compares the first encrypted request to the first encrypted manifest. In response to a match between the first encrypted request and the first encrypted manifest, the broker API retrieves from the storage device the first media content that is encrypted by the first streaming key. The broker API delivers the encrypted first media content to the first streaming application. The first streaming application receives the encrypted first media content and generates first content by decrypting the encrypted first media content using the first streaming key. The first streaming application then displays the first content to the user via the first streaming application UI.

According to another aspect, a system for caching and delivering media content from multiple streaming providers includes a storage device that implements a broker Application Programming Interface (API) and a display device that implements a streaming application. The broker API is configured to: receive from the streaming application an encrypted request for first media content; retrieve from the storage device, a first encrypted manifest of locally stored content; compare the encrypted request to the first encrypted manifest, wherein the request and the first manifest both are encrypted by a first streaming key, which is known by the streaming application, but not known by the broker API; in response to a match between the encrypted request and the first encrypted manifest, retrieve from the storage device the first media content that is encrypted by the first streaming key; and deliver the encrypted first media content by the broker API to the first streaming application. The streaming application is configured to: receive a consumer selection of first content via a streaming application User Interface (UI); generate the encrypted request by encrypting the consumer selection of first content using the first streaming key; transmit the encrypted request to the broker API; receive, from the broker API, encrypted first media content that corresponds to the encrypted request; generate first content by decrypting the encrypted first media content using the first streaming key; and display the first content to the user via the streaming application UI.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a storage device on a local area network (LAN) in a premises; exemplary devices include a cable modem, Network Attached Storage (NAS), a Wi-Fi hot spot device, an optical network unit (e.g. S-ONU), and the like—in each case with suitable processing capability, and typically an MSO-provided device in a home LAN) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:

For the Cable Provider: Less bandwidth is required for customers using streaming services from a multitude of providers. The reduction results in savings in capacity build up, maintenance, labor, etc. Ability to offer capacity as an add-on to streaming providers as a (paid) service.

For the Streaming Provider: Better experience with potentially fewer buffering messages for the user as some (or most) or the content comes from local storage (internal to the cable modem, or connected in communication with the cable modem, e.g., smart TV, home file server, etc.). Ability to share content from nearby users eliminating the need for additional network upgrades.

For the User: Enhanced experience with the potential of reduction of bandwidth used against imposed cap on the Internet bandwidth usage. Furthermore, the user is able to use participating streaming applications even in offline mode.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
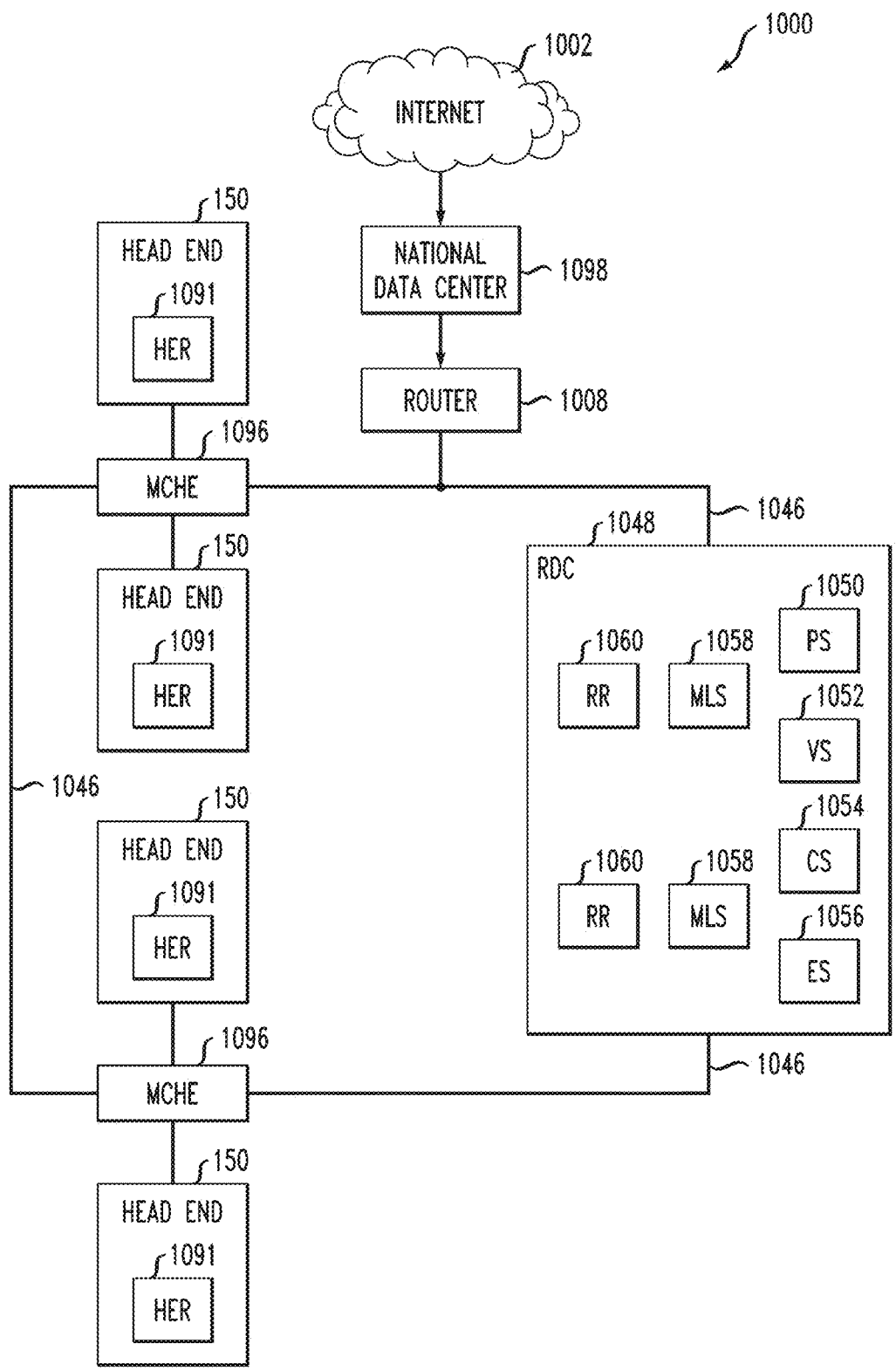
FIG. 1 is a block diagram of an exemplary embodiment of a system, within which one or more aspects of the invention can be implemented.

As noted, IP-based data services may be provided over a variety of networks. Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area. In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, California, USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
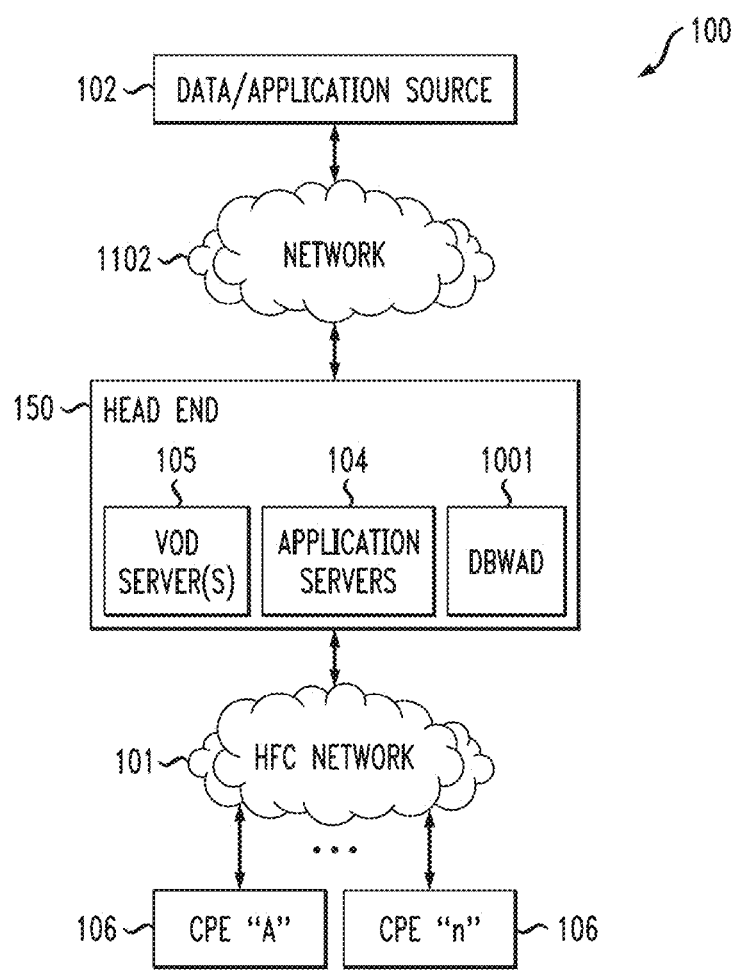
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third-party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes and high-speed cable modems for providing high bandwidth Internet access in premises such as homes and businesses.

Also included (for example, in head end 150) is a dynamic bandwidth allocation device (DBWAD) 1001 such as a global session resource manager, which is itself a non-limiting example of a session resource manager.

Figure 3:
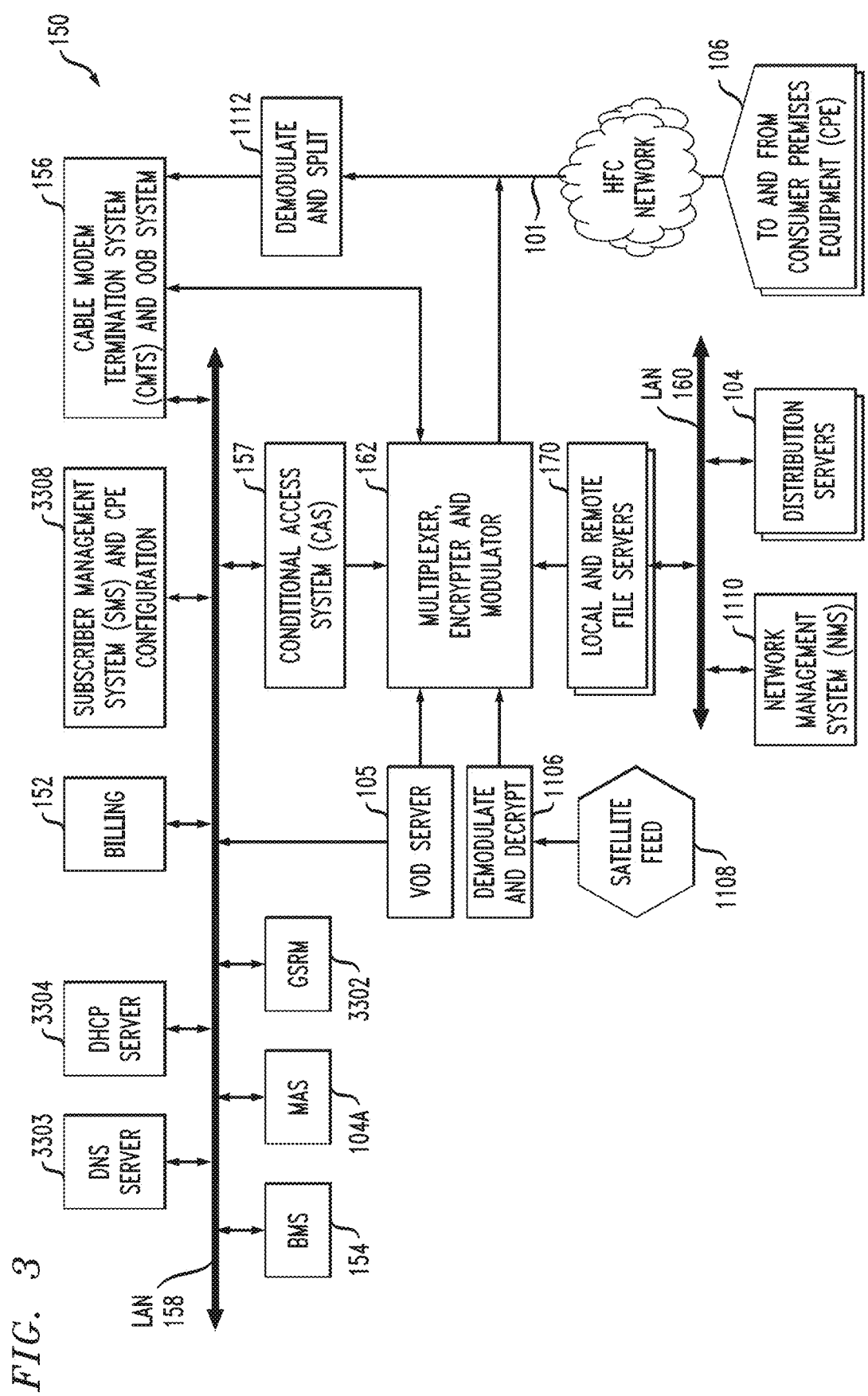
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., traditional audio, traditional (as distinguished from IPTV) video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colorado 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data (including IPTV) on an HFC system is one non-limiting exemplary context associated with one or more embodiments. However, one or more embodiments are generally applicable to IPTV, regardless of what kind of functionality is employed.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more DHCP server(s) 3304 can also be located where shown or in different locations.

Figure 4:
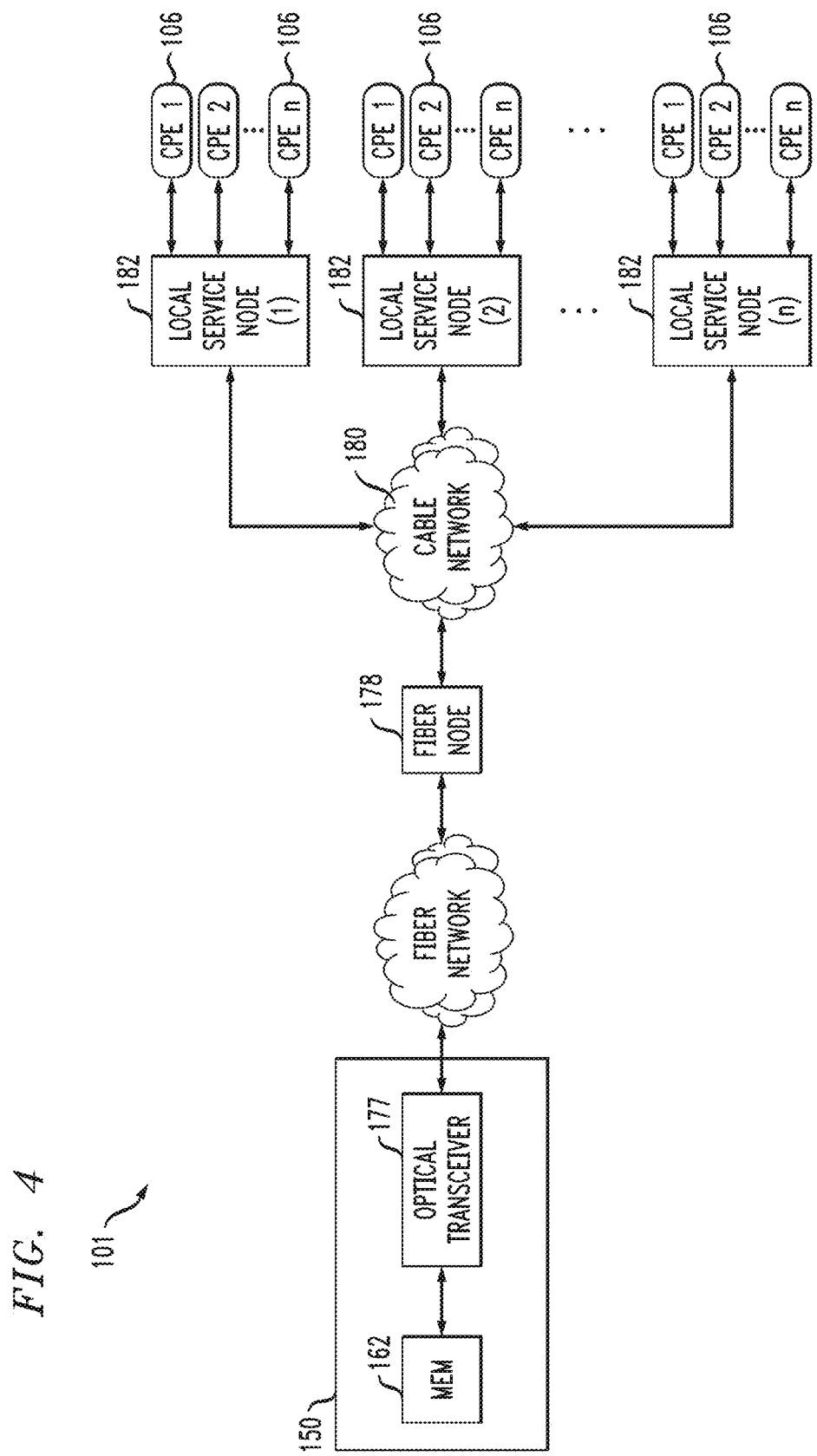
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number of CPE 106 per node 182 may be different than the number of nodes 182.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
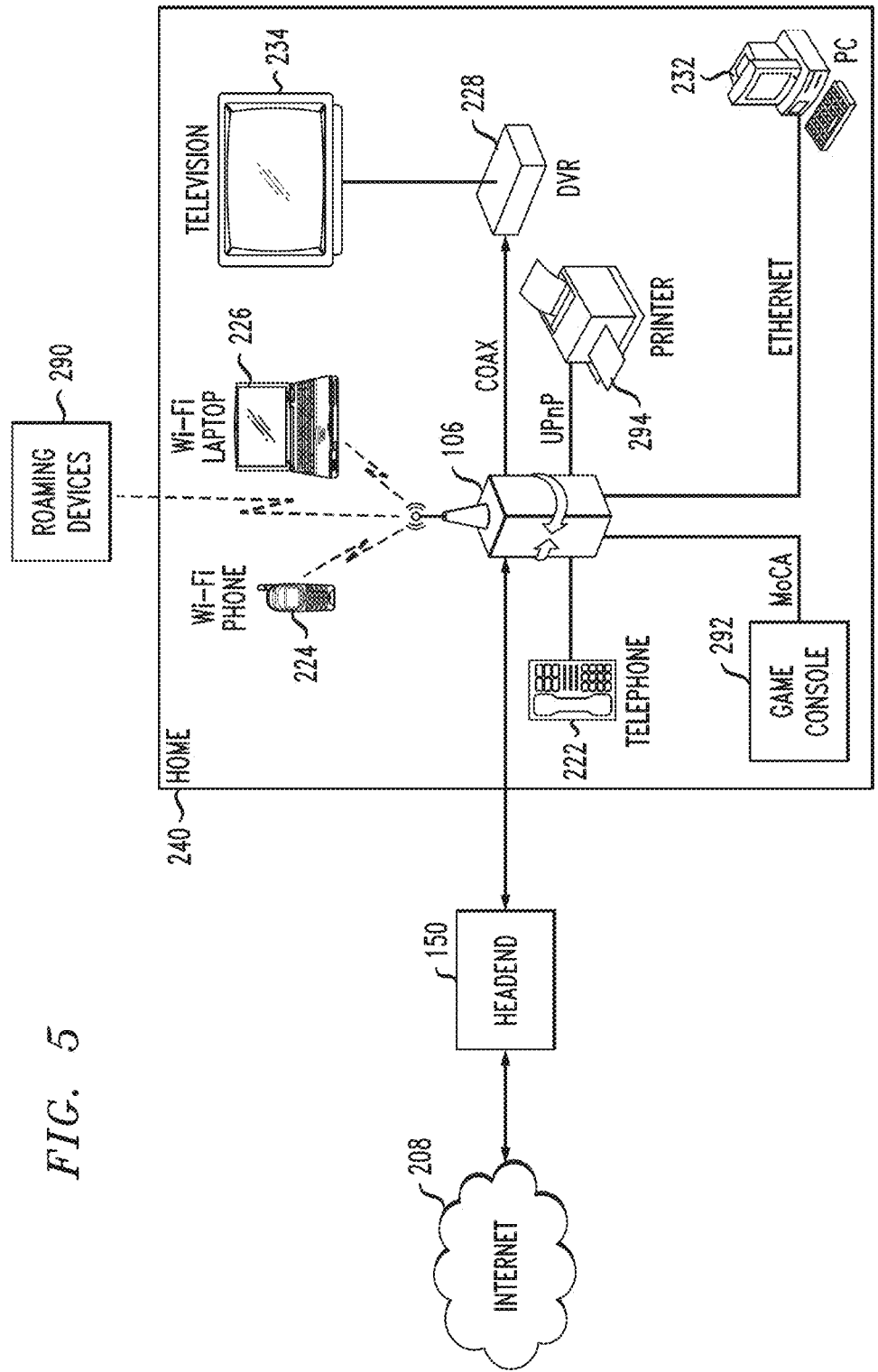
FIG. 5 is a functional block diagram of a premises network, including an exemplary centralized customer premises equipment (CPE) unit, interfacing with a head end such as that of FIG. 3.
Figure 6:
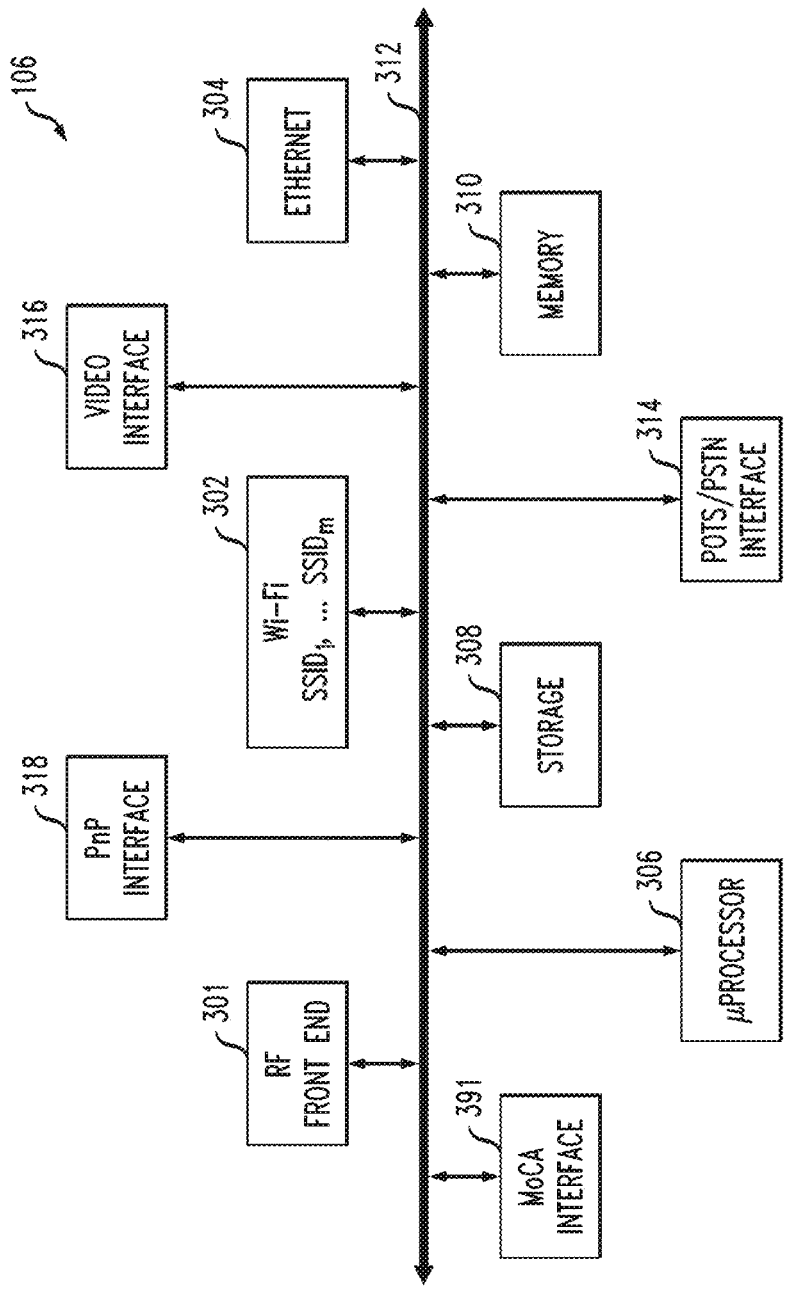
FIG. 6 is a block diagram of one exemplary embodiment of the CPE of FIG. 5.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example, over a universal plug and play (UPnP) interface, and/or a game console 292; for example, over a multimedia over coax alliance (MoCA) interface. Game console 292 is one example of a game console that could be used to watch IPTV in accordance with aspects of the invention. However, game consoles on which one or more embodiments are to be practiced can be connected to the Internet in many ways; an HFC network providing high-speed IP data in addition to traditional video content is merely one non-limiting exemplary embodiment. Game console 292 could be connected to CPE 106 by, for example, Ethernet, Wi-Fi, or MoCA (e.g. via a MoCA-to-Ethernet bridge). All types of game consoles may not necessarily be capable of connection via all of Ethernet, Wi-Fi, and MoCA. Some embodiments employ a Microsoft Xbox console as game console 292. Furthermore, as noted, other embodiments employ alternative platforms such as the Roku box or other media streamers; the same can be connected to CPE 106 instead of or in addition to gaming console 292.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., IPTV or other Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, the gaming console 292, or other device (e.g., media streamer). CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random-access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to interne service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304, MoCA interface 391, or plug-and-play (PnP) interface 318.

Additionally, the RF front end 301 modulates, encrypts/multiplexes as required, and transmits digital information for receipt by upstream entities such as the CMTS or a network server. This includes upstream commands from Xbox or other game console 292. In one or more embodiments, the Xbox or other game console does not communicate directly with the RF Front End 301; rather, it communicates with the RF Front End 301 over Ethernet 304 or Wi-Fi 302. Upstream commands from the Xbox or other game console 292 are sent to the RF Front End over Ethernet 304 or Wi-Fi 302 and then upstream into the network, from the RF Front End 301, via DOCSIS or the like. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network.

The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

In addition to traditional "broadcast" content (e.g., video programming), the systems of FIGS. 1-6 also deliver Internet data services (including IPTV) using the Internet protocol (IP), although other protocols and transport mechanisms of the type well known in the digital communication art may be substituted. The IP packets are typically transmitted on RF channels that are different that the RF channels used for the broadcast traditional video and audio programming, although this is not a requirement. The CPE 106 are each configured to monitor the particular assigned RF channel (such as via a port or socket ID/address, or other such mechanism) for IP packets intended for the subscriber premises/address that they serve.

Figure 8:
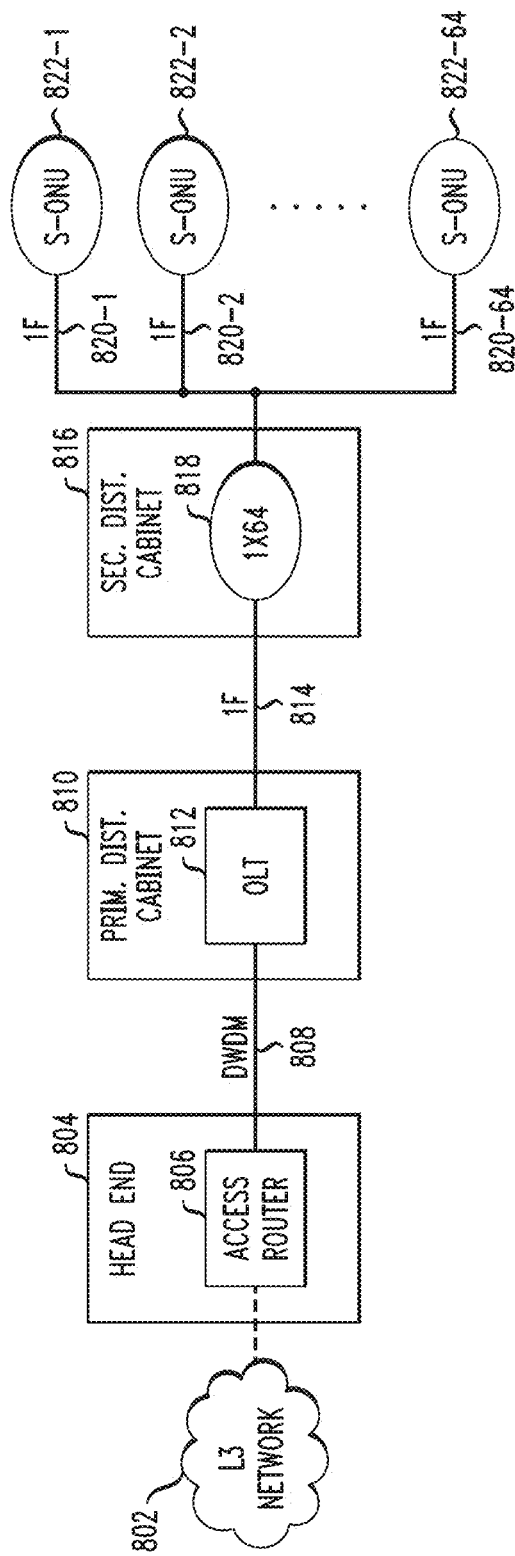
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1, 820-2 through 820-64, it being understood that a different ratio splitter could be used in other embodiments and/or that not all of the 64 (or other number of) outlet ports are necessarily connected to an S-ONU.

Figure 9:
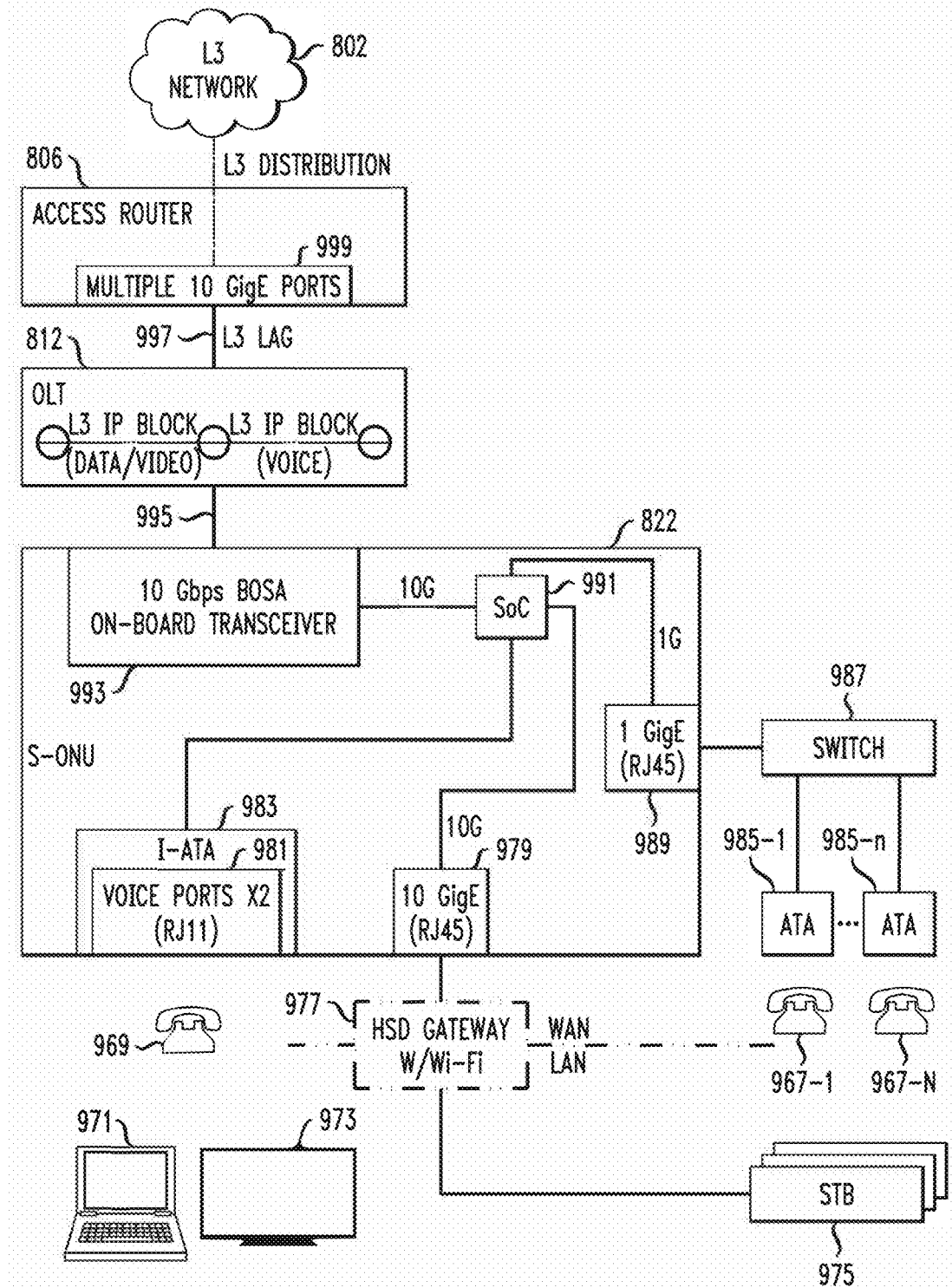
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical sub-assembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-n, suitable for the needs of the business, via external analog telephone adapters (ATAs) 985-1 through 985-n. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Figure 10:
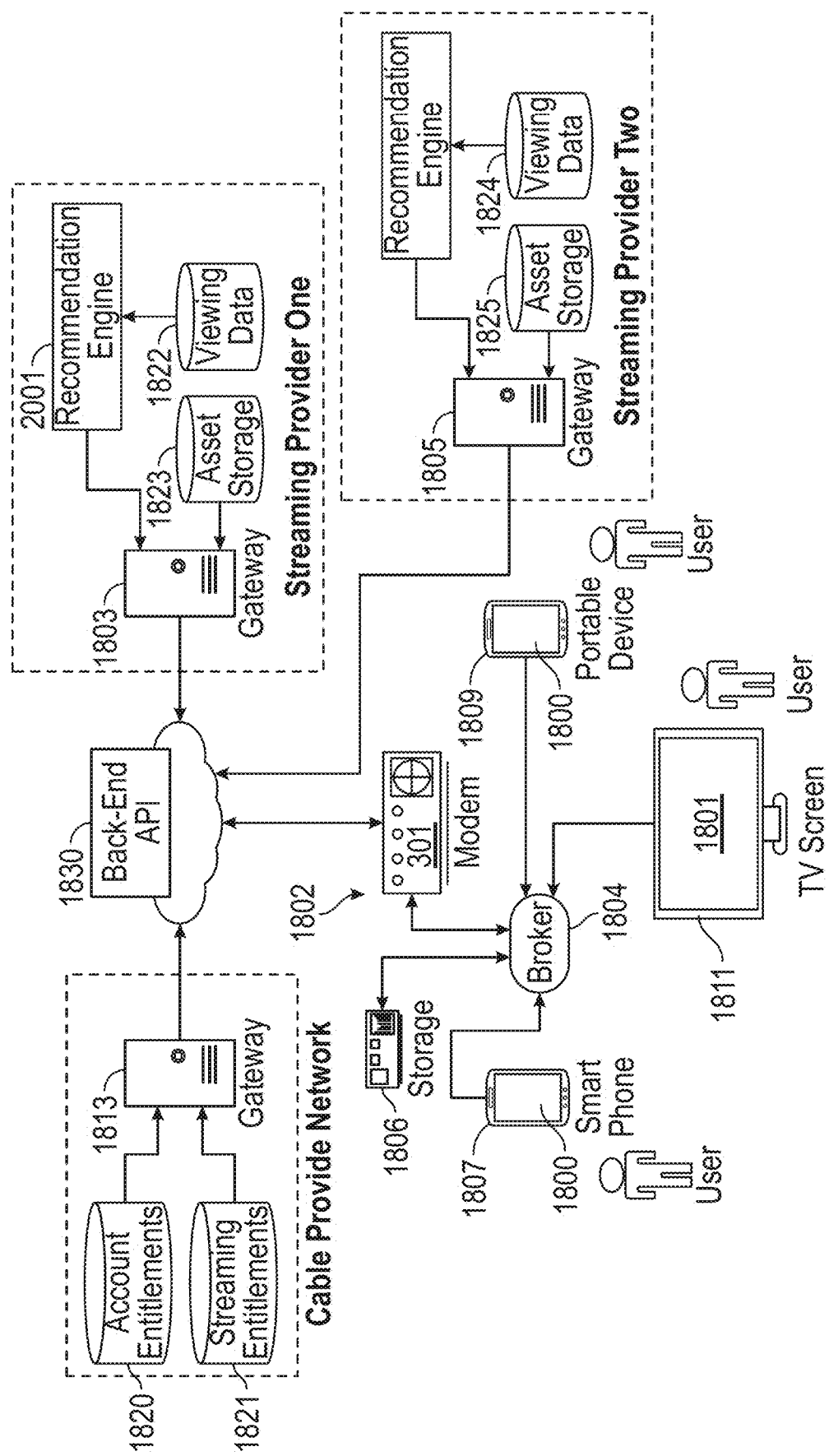
FIG. 10 is a schematic of consumer premises equipment (CPE) including a cable modem that implements a broker API for interfacing with a local storage unit, connected in communication with a cable operator gateway (head end) and a plurality of streaming provider gateways.

FIG. 10 shows a first streaming application 1800 and a second streaming application 1801 running in one or more display devices connected to a Local Area Network (LAN) 1802 that uses a consumer premises equipment (e.g., RF front end 301) for Internet connectivity. The display devices can include, by way of non-limiting examples, a smart phone 1807, some other portable device 1809, and a television 1811. By way of non-limiting examples, the consumer premises equipment 301 can be conventional coaxial cable (i.e. DOCSIS-compliant) or it can be an optical network unit. The consumer premises equipment 301 connects the LAN 1802 in communication with Cable Provider's gateway 1813, Streaming Provider One's gateway 1803, and Streaming Provider Two's gateway 1805. Cable Provider's equipment also includes the consumer premises equipment 301, which is configured to implement a broker Application Programming Interface (API) 1804 that interacts with the streaming application 1800. The broker API is, for example, shared with the Streaming Providers (via a proprietary software developers kit or SDK) but, for example, is not disclosed to the general public. Optionally, the broker API 1804 is installed in the consumer premises equipment 301 by Cable Provider and is not directly accessible, downloadable, or modifiable by a consumer. Cable Provider's gateway 1813 tracks account entitlements 1820 as well as streaming entitlements 1821, and is configured to implement a back-end API 1830 for communication with the streaming provider gateways 1803, 1805. The back-end API 1830 acts as a proxy between the streaming provider gateways 1803, 1805 and the cable provider gateway 1813. In one or more embodiments, it provides a way for the streaming provider gateways to push commands and diff files through the cable provider gateway directly to local storage 1806 that is controlled by the cable provider, not by the streaming providers. In other embodiments, Cable Provider pushes the commands and diff files through the broker API 1804 to the local storage 1806. In addition to the gateway 1803, Streaming Provider One maintains a recommendation engine 2001, which draws from viewing data 1822 to inform the gateway 1803 what to retrieve from asset storage 1823. Streaming Provider Two similarly maintains a recommendation engine 2021, which draws from viewing data 1824 to inform the gateway 1805 what to retrieve from asset storage 1825. Note that viewing data 1822 and asset storage 1823 are encrypted by a first key that is known by Streaming Provider One but is not known by Cable Provider or by Streaming Provider Two. Similarly, viewing data 1824 and asset storage 1825 are encrypted by a second key that is known by Streaming Provider Two but is not known by Cable Provider or by Streaming Provider One. In this set-up, the streaming application 1800 can automatically determine the IP address of the consumer premises equipment 301 as well as the broker API 1804. At least a portion of the functionality of the API could be implemented via REST (acronym for REpresentational State Transfer).

The broker API 1804 communicates with a storage device 1806, which houses a plurality of files, some of which are designated files for the streaming application 1800. By way of non-limiting examples, the storage device 1806 could be in the consumer premises equipment, or in a Wi-Fi extender, and could be about 10 Terabytes (TB) in size. It should be noted that the files in question do not necessarily need to be movie data files (e.g. MPEG-2/4, etc.). Instead, in one or more embodiments, they are proprietary files that only the appropriate service provider can decode. In one or more embodiments, the streaming application 1800 encrypts the designated files with a key based on a user login. For efficiency reasons, the streaming application 1800 can query the Broker API 1804 through a secure (encrypted) channel so that only the application 1800 can access its designated files. Thus, the application 1800 can use the broker to serve data files, which advantageously eliminates or reduces direct requests through the Internet. In one or more embodiments, the broker API 1804 accesses a manifest which contains a listing of resource files stored locally in the storage device 1806. The manifest also can be encrypted by the streaming application 1800. The broker 1804 manages storage through the preset API. As stated above, the API includes commands (requests and responses) that are supported by both client and server. They can be referred to as 'preset' in the context that only supported commands are to be used. This is similar to the widely-popular HTTP protocol which has preset verbs (GET, PUT, POST, DELETE, etc.) which are supported by both the client (browser) and server (web server).

If the streaming application 1800 requires a specific data file (or a segment of such a file), the broker API 1804 tries to locate the specific file in storage within the consumer premises equipment 301, TV DVR or external storage (NAS) 1806 on the same LAN as the broker API 1804. If the data is not found on the LAN, the broker makes a request to the local service node 182 of the back-end network (shown in FIG. 4).

Some streaming providers do not publish viewership data, do not want other streaming providers or media providers to have their viewership data, and as such, would not be open to any system which allows any third-party to infer the actual content viewed by their users. In this context, the cable operator acts like a hosting provider akin to Amazon Web Services (AWS®—registered trademark of Amazon, Inc. of Seattle, Washington) that provides transparent access to encrypted storage without being able to decrypt the stored data itself. Therefore, the request is encrypted by the user login so that it is not apparent to the cable operator what file the broker API wants to access. This affords the service provider strong intellectual property protection. The data in question would not even be readable by the host (cable operator).

One or more embodiments allow some content that is expected to be consumed at a later date to be pushed in a staggered fashion or when there is less pressure on the infrastructure. For instance, if a user views season 1, episode 3, then recommendation engine 2001 determines episode 4 would need to be made available immediately. However, episodes 5-9 or season 2 might be scheduled for download during off-peak hours (e.g. 3 AM). For a large data package, it might be beneficial to calculate a staggered time schedule for content to download to optimize available bandwidth for the streaming provider. Therefore, the recommendation engine 2001 instructs the streaming provider gateway 1803 to push the encrypted content to the cable provider gateway 1813, via the back-end API 1830, for later download push to local storage 1806; that is, in one or more embodiments, the streaming provider does not directly access the broker 1804 or storage 1806.

In one or more embodiments, this system acts like a storage device used to contain streamed content from one or more providers. This means that in some instances, storing data using MPEG or other standard options might not be possible. Each streaming provider may desire to maintain all data about what the user watches as a trade secret. As such, the storage can be managed by the streaming provider along guidelines and under specific contractual obligation(s) between the cable provider (which owns or controls the consumer premises equipment and storage system) and the streaming provider.

In one or more embodiments, the system provides anonymous storage for the streaming providers used by the cable customer. For instance, Streaming Provider One has an agreement with the cable provider to access a specific capacity (e.g., 300 MB) in the storage device 1806. In one or more embodiments, the data to be stored could be encrypted so that it would not be accessible to the cable provider (even if the cable provider owned the consumer premises equipment 301). Streaming Provider One, in this scenario, could "push," to the broker API 1804, content that it predicts the user would consume in the near future (e.g., within the next two days).

In one or more embodiments, the cable company also provides an API, which presents 'nearby' cable modems with specified storage capacity to reduce the odds of storing the same content more than once. For instance, Show A Season 2 Episode 3 is stored in the storage device 1806 associated with the consumer premises equipment 301 of the LAN 1802. The local storage device 1806 may be integrated into the consumer premises equipment 301 or may be connected in communication with therewith via the LAN 1802. Examples of suitable storage devices include magnetic hard drives, writable optical drives, "flash" SSD drives, etc. Notably, the local storage device 1806 is "partitioned" so that each partition is accessible using a different password (a "streaming key"); each streaming application has a different streaming key that is not known by any of the other streaming applications. The same applies to all streaming providers after prior agreement with the cable operator, where allocated storage capacity is agreed upon for each subscriber. Any participating streaming provider can, for example, manage predictive analytics on usage or run any proprietary algorithms on its own viewing data to determine which content would be needed ahead of time and ensure that it is available. The cable company does not need to be made aware of data flowing on the back-end of this system except, that it complies with agreed upon terms (of course, if agreed and appropriate, in some embodiments the cable company could be made aware). In one or more embodiments, this ultimately allows both the cable operator and the streaming companies to work on shared hardware and software without exposing or providing access to internal infrastructure or proprietary data (such as usage statistics, etc.).

Any participating streaming operator can be provided with a check-option within its application (loaded on the phone, Roku® device, Apple TV® device, etc.). "Roku" is a registered trademark of Roku, Inc. of San Jose, California "Apple TV" is a registered trademark of Apple, Inc. of Cupertino, California Such an option includes checking the local manifest for any available asset before attempting to download from the Internet. Not only does this reduce the download time and offer a more reliable option, but in some instances, it mitigates any cost associated with exceeding a usage cap as might be assigned by some MSOs. Any content pushed to the storage system can be exempted from the cap in one or more embodiments, as it is considered a back-end PUSH.

One or more embodiments allow for storage to be segregated across all hardware being used. A custom API ensures that each streaming provider can only access its own data files. In this context (virtual disk), the cable provider is managing access to a virtual distributed system for one or more streaming providers. The latter are responsible for storage, as well as deletion, for any data file based on internal logic. This allows different streaming providers to implement different algorithms, which might be proprietary, without having to share logic. The cable operator will typically need to track the storage usage for all users in order to not exceed available (or agreed upon) capacity. In one or more embodiments, the broker API 1804 is available to streaming providers and allows them to manage their 'virtual disks' by sending commands through the backend API 1830 to the cable provider gateway, which then delivers files to the local storage 1806. The API commands can include, for example:

PUT <file-name> <payload> Send a specific file to local storage
GET <file-name>: Retrieve content of a file
DEL <file-name>: Remove a file
LIST: Return a list of stored files
CLEAR: Clear stored content on disk In current streaming applications, when there is no Internet connection, the application (regardless of the platform)

typically displays an error message and the application is not usable until Internet connectivity is restored.

Advantageously, according to one or more embodiments, a process 1900 (shown in FIG. 11) is followed instead. At 1902, initialize the application (system). At decision block 1904 (shown as a rectangle for illustrative brevity), check whether the broker feature is enabled. If not (NO branch), then at 1905 select a direct connection to a Streaming Provider gateway via the internet. If enabled (YES branch), at 1906, detect the broker. At decision block 1908 (shown as a rectangle for illustrative brevity), query the broker for a manifest. If a manifest is not found (NOT FOUND branch), then at 1905 select the direct connection to the gateway. Otherwise (FOUND branch), at 1910, decrypt the manifest. At 1911, determine a list of local content to display (i.e. by the recommendation engine cooperating with the broker API). At 1912, display to the user the list of local content available for reduced operation (resume watching, new recommendations, etc.). At decision block 1914 (shown as a rectangle for illustrative brevity), receive a user selection of content and request, from the broker, a file listed in the manifest. At 1905 (NOT FOUND branch), if the file is not found, then select the direct connection to the gateway. Otherwise (FOUND branch), at 1916 process the file and at 1918 conduct streaming application internal processes (playback, browsing, etc.) including real-time decryption of the local file. At 1920, when the content has been consumed, notify the Streaming Provider gateway 1803 or 1805 to delete the content from the storage device 1806 via the broker API 1804.

Once the available files are returned, the streaming application displays all content that is available off-line. This allows the user to stream the off-line content, with a much better user experience than what is currently available.

Figure 12:
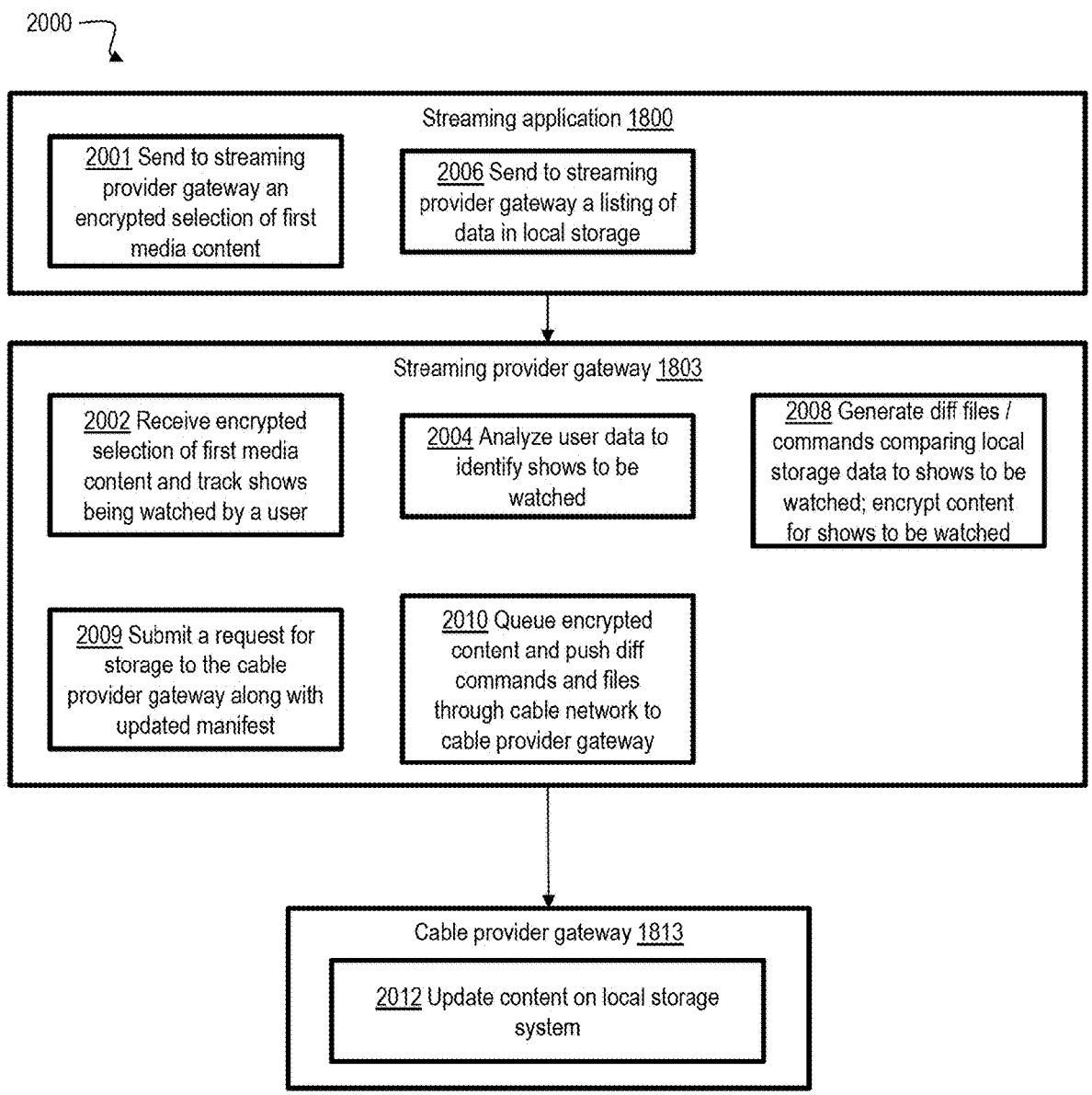
FIG. 12 is a flowchart of a method implemented by the streaming application, a streaming provider gateway, and cable provider gateway using the broker API of FIG. 10.

For optimum operation, the streaming provider is responsible for tracking viewing statistics and generating predictive analytics for a cache-ahead process 2000 (shown in FIG. 12). The process 2000 makes use of a recommendation engine or recommender 2001 (proprietary to each streaming provider as known to the skilled artisan), and includes, for example, the following steps. At 2001, the streaming application 1800 sends to the streaming provider gateway 1803 an encrypted selection of first media content to be consumed by a user. At 2002, the recommendation engine 2001 receives the encrypted selection of first media content and tracks shows being watched by the user. At 2004, the recommendation engine 2001 analyzes user data to identify second media content (shows to be watched) related to the first media content. At 2006, the streaming application 1800 sends to the streaming provider gateway 1803 a listing of data stored in the user's local storage. At 2008, the streaming provider gateway 1803 generates a diff file that instructs the cable provider gateway how to change the files on the local storage, and encrypts content for the shows to be watched, not already found in local storage. At 2009, the streaming provider gateway submits a request for storage to the cable operator network along with the updated manifest. At 2010, queue up encrypted content at the streaming provider gateway and then push the diff commands and files through a back-end API 1830 to the cable provider network gateway. At 2012, the cable provider gateway 1813 then pushes the content through the consumer premises equipment 301 to the local storage system 1806. A similar process is used to clear any content file that needs to be purged (e.g., the user already has watched an episode of a show).

Figure 13:
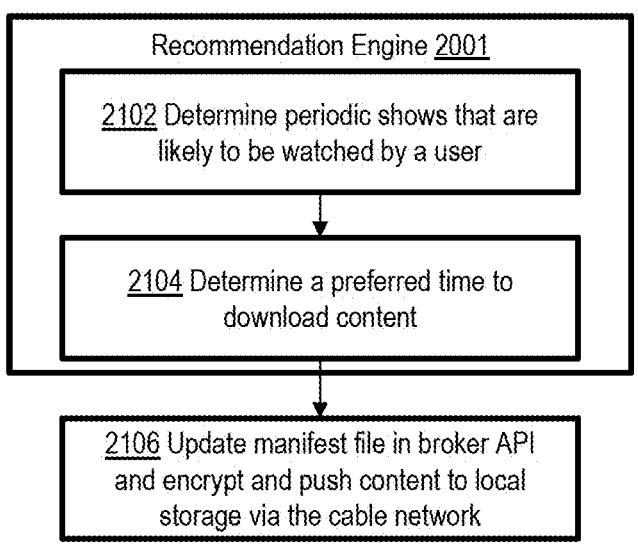
FIG. 13 is a flowchart of a method implemented using a streaming provider's recommendation engine.

In one or more embodiments the recommendation engine 2001 also determines content consumed on a periodic basis, e.g., content that airs once per week and cannot be 'binged.' For this content, a process 2100 (shown in FIG. 13) is used. At 2102, use the recommendation engine 2001 to determine which shows are likely to be watched on a periodic basis. At 2104, use the recommendation engine to determine a preferred time to download the content. At 2106, when a show airs, update the manifest file in the broker API 1804 and automatically encrypts and push the content to the local storage 1806 via the cable network operator 1813. Thus, the content enters local storage 1806 and can be made available offline (or online) when requested by the user. In one or more embodiments, the streaming provider and the cable provider interact via a back-end batch process during low-demand hours when ample bandwidth is available for pushing the content to the local storage.

The skilled artisan will thus appreciate that in one or more embodiments, offline content is automatically cached and any streaming device in the household has access to offline capability via the broker API 1804. Streaming application(s) on streaming device(s) can then retrieve files from local storage 1806 as appropriate. Suitable streaming devices can include, as non-limiting examples, a smart TV 1811 (e.g., a Roku® TV or Apple® TV), a mobile phone 1807, or a portable device 1809 such as a tablet computer or laptop computer. In order for a streaming application to interact with the broker API 1804, certain modifications to one or more algorithms of the streaming application will be implemented as will be appreciated by the ordinary skilled worker in light of the present disclosure, e.g., FIG. 11.

Figure 14:
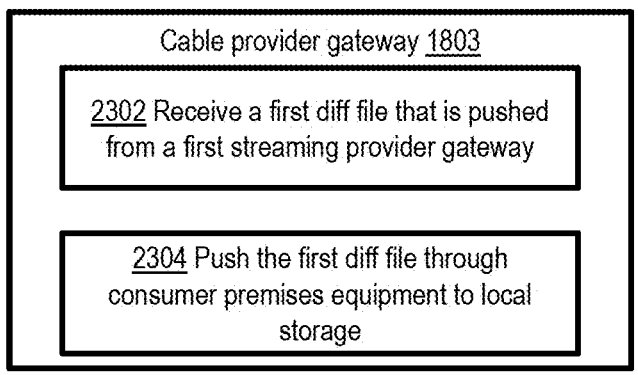
FIG. 14 is a flowchart of a file handling method implemented by a cable provider gateway according to an exemplary embodiment.
Figure 15:
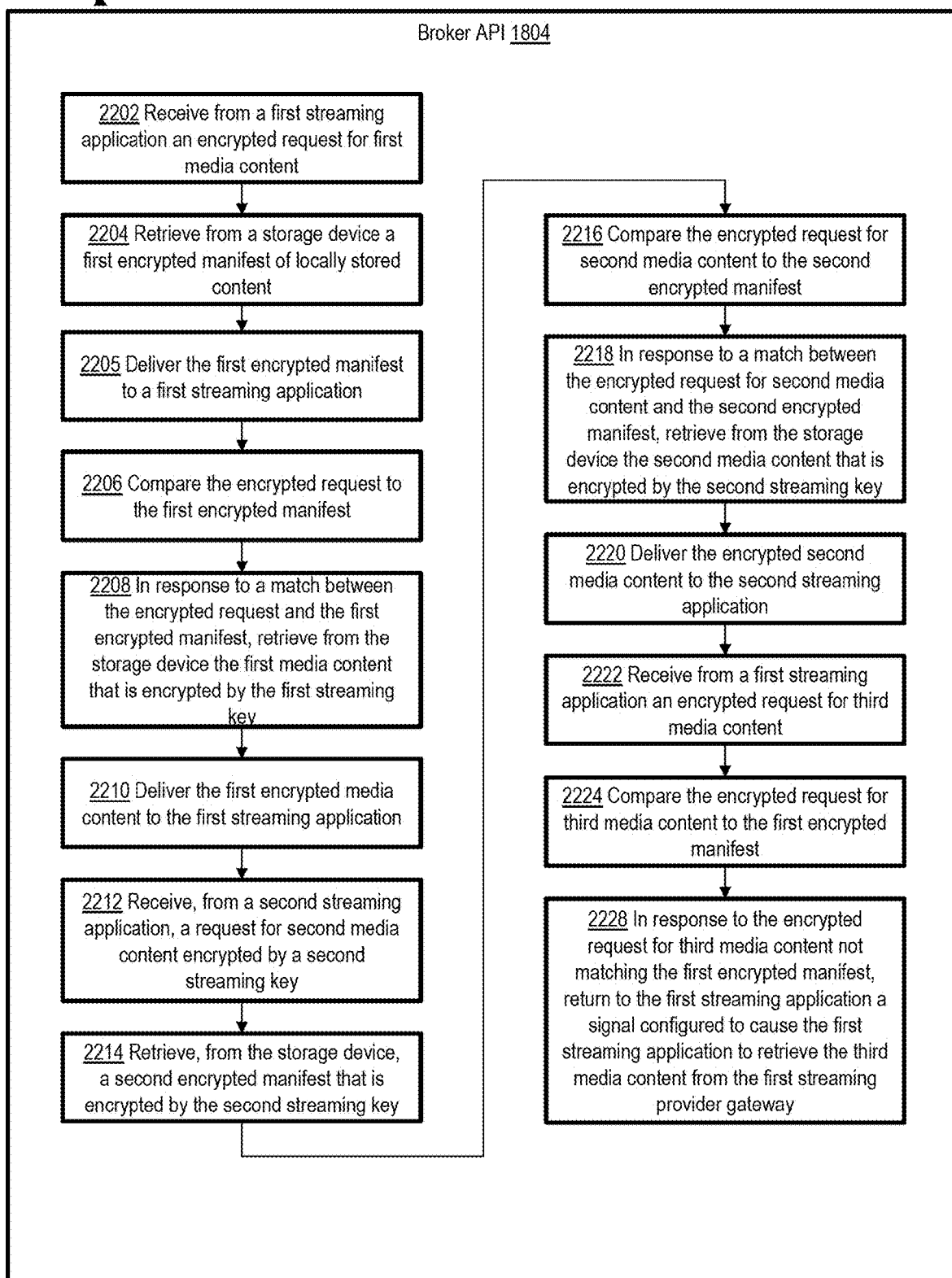
FIG. 15 is a flowchart of a method implemented by the broker API according to an exemplary embodiment.

In view of the foregoing discussion and the accompanying figures, the ordinary skilled worker will appreciate that, according to an exemplary embodiment as shown in FIGS. 10 and 14, a broker Application Programming Interface (API) 1804 (which can be owned, for example, by an MSO) is implemented at a consumer premises equipment 301 that includes a memory and a processor, connected in communication with a cable provider gateway 1813, a first streaming provider gateway 1803, a second streaming provider gateway 1805, and a Local Area Network (LAN) 1802. The broker API 1804 implements a method 2200, as shown in FIG. 15. At 2202 the broker API 1804 receives, from a first streaming application 1800 implemented in the LAN, an encrypted request for first media content; at 2204 the broker API retrieves, from the storage device, a first encrypted manifest of locally stored content; at 2206 the broker API compares the encrypted request to the first encrypted manifest (the request and the first manifest both are encrypted by a first streaming key, which is known by the first streaming provider gateway and the first streaming application implemented in the LAN, but not known by the broker API, the second streaming provider gateway, the cable provider gateway, and a second streaming application); in response to a match between the encrypted request and the first encrypted manifest, at 2208 the broker API retrieves, from the storage device, the first media content that is encrypted by the first streaming key; and at 2210 the broker API delivers the encrypted first media content to the first streaming application.

In one or more embodiments, at 2212 the broker API receives, from the second streaming application, a request for second media content that is encrypted by a second streaming key, which is known by the second streaming provider gateway and the second streaming application but not known by the broker API, the first streaming provider gateway, the first streaming application, and the cable provider gateway. At 2214 the broker API retrieves, from the storage device, a second encrypted manifest that is encrypted by the second streaming key. At 2216, the broker API compares the encrypted request for the second media content to the second encrypted manifest. At 2218, in response to a match between the encrypted request for the second media content and the second encrypted manifest, the broker API retrieves encrypted second media content corresponding to the encrypted request received from the second streaming application. At 2220, the broker API delivers the encrypted second media content to the second streaming application.

In one or more embodiments, at 2222 the broker API receives from the first streaming application an encrypted request for third media content; the third request is encrypted by the first streaming key. At 2224, the broker API compares the encrypted request for third media content to the first encrypted manifest. At 2228, in response to the encrypted request for third media content not matching the first encrypted manifest, the broker API returns to the first streaming application a signal configured to cause the first streaming application to retrieve the third media content from the first streaming provider gateway.

Figure 11:
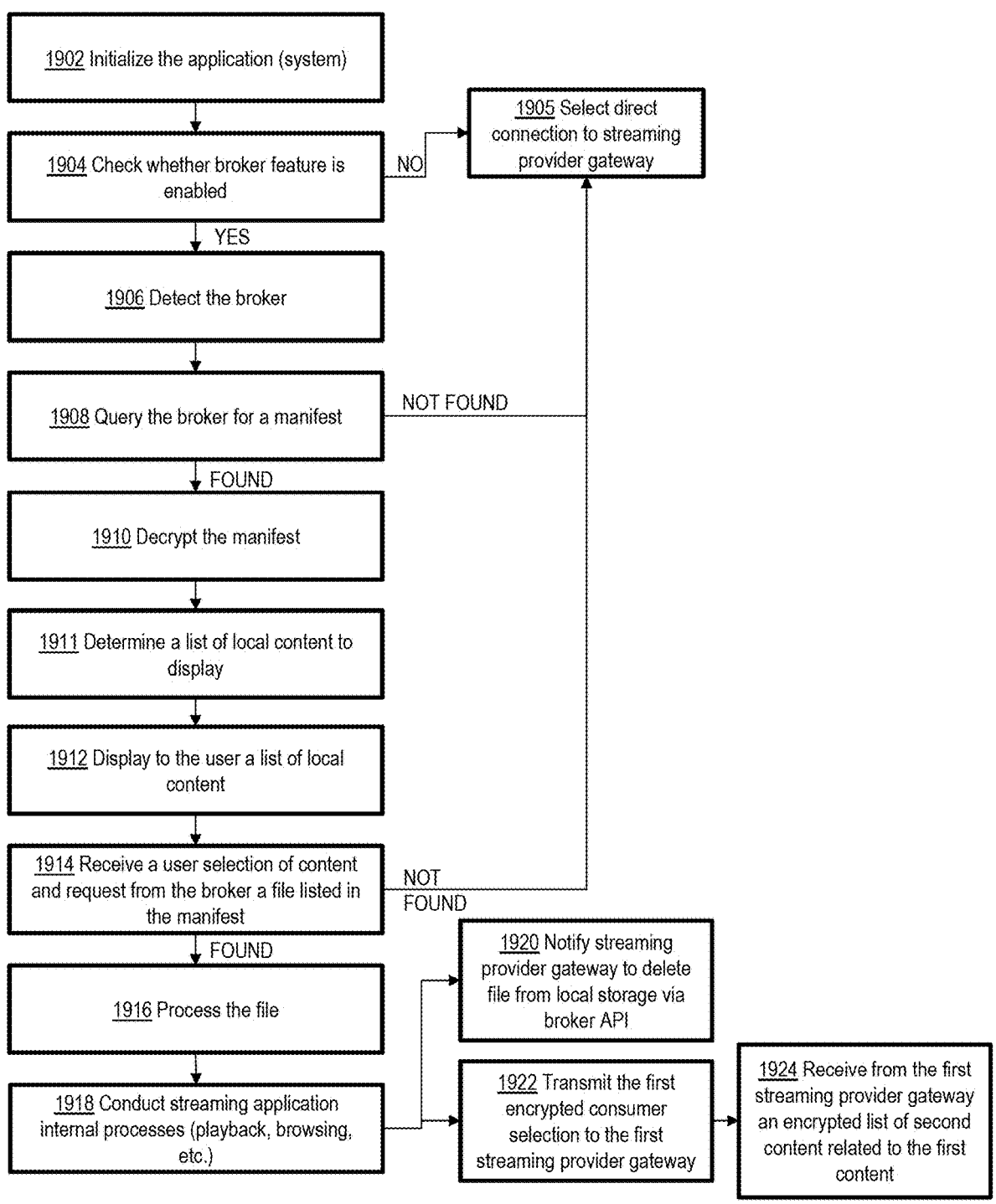
FIG. 11 is a flowchart of a method implemented by a streaming application using the broker API of FIG. 10.

According to another aspect, a streaming application implements a method 1900, as shown in FIG. 11, for caching and delivering media content from multiple streaming providers. At 1914, the streaming application receives a consumer selection of first content from a user via a first streaming application User Interface (UI), generates a first encrypted content selection by encrypting the consumer selection of first content using a first streaming key, and transmits the first encrypted content selection to a broker Application Programming Interface (API) that is implemented in a Local Area Network (LAN) in communication with the first streaming application; the broker API does not know the first streaming key. At 1916, the streaming application receives, from the broker API, encrypted first content corresponding to the first encrypted content selection, and generates first content by decrypting the encrypted first content using the first streaming key. At 1918, the first streaming application displays the first content to the user via the first streaming application UI.

In one or more embodiments the method 1900 also includes, at 1904 and 1906, the first streaming application confirming that the broker API is enabled and detecting the broker API.

In one or more embodiments, at 1908 the first streaming application retrieves an encrypted manifest from the broker API and at 1910 the first streaming application decrypts the encrypted manifest. At 1911 the first streaming application determines a list of local content to display, and at 1912 displays the list of local content to the user.

In one or more embodiments, at 1920 after displaying the first content, the first streaming application communicates to a first streaming provider gateway an instruction to delete the encrypted first content from local storage that is connected in communication with the broker API via the LAN.

In one or more embodiments, at 1922 after receiving the consumer selection of first content, the first streaming application transmits to a first streaming provider gateway the first encrypted consumer selection. At 1924, the first streaming application receives from the first streaming provider gateway an encrypted list of second content that is related to the first content.

In one or more embodiments, a second streaming application receives a consumer selection of second content via a second streaming application UI. The second streaming application generates a second encrypted content selection by encrypting the consumer selection of second content using a second streaming key. The broker API and the first streaming application do not know the second streaming key. The second streaming application transmits the second encrypted content selection to the broker API and receives, from the broker API, encrypted second content corresponding to the second encrypted content selection. The encrypted second content is encrypted by the second streaming key. The second streaming application generates second content by decrypting the encrypted second content using the second streaming key, and displays the second content to the user via the second streaming application UI.

According to another aspect, a streaming provider gateway implements a method 2000 for proactively delivering media content to a subscriber streaming application, as shown in FIG. 12. At 2002, the streaming provider gateway receives from the subscriber streaming application an encrypted selection of first media content to be consumed. The selection is encrypted by a first streaming key, which the streaming provider gateway and the subscriber streaming application know. At 2008 the streaming provider gateway encrypts the first media content by the first streaming key. At 2010 the streaming provider gateway pushes the encrypted first media content to a cable provider gateway that does not know the first streaming key. At 2004, the streaming provider gateway uses a recommendation engine to identify second media content corresponding to the first media content. At 2008, the streaming provider gateway encrypts the second media content by the first streaming key. At 2010, the streaming provider gateway pushes the encrypted second media content from the streaming provider gateway to the cable provider gateway before the subscriber streaming application requests it.

According to another aspect, a cable provider gateway and a broker API implement methods 2200, 2300 for locally storing and delivering encrypted content, as shown in FIGS. 14 and 15. At 2302, the cable provider gateway receives a first diff file that is pushed from a first streaming provider gateway. The first diff file includes first content and an updated manifest that are encrypted by a first streaming key. The first streaming provider gateway and a first streaming application know the first streaming key but the cable provider gateway does not know the first streaming key. At 2304, the cable provider gateway pushes the first diff file through a consumer premises equipment to local storage. At 2200 the broker API receives an encrypted selection of media content from the first streaming application. The encrypted selection of media content is encrypted by the first streaming key, which the broker API does not know. At 2206 and 2208 the broker API matches the encrypted selection to the updated encrypted manifest in the local storage. At 2208, the broker API retrieves the encrypted first content from the local storage in response to the encrypted selection. At 2210, the broker API delivers the encrypted first content to the first streaming application via the LAN.

In one or more embodiments, the first diff file includes instructions to delete second media content from the local storage and the updated manifest removes the second media content from a list of locally stored content.

In one or more embodiments, the cable provider gateway also receives a second diff file that is pushed from a second streaming provider gateway. The second diff file includes third media content and a second updated manifest that are encrypted by a second streaming key. The second streaming provider gateway and a second streaming application know the second streaming key but the cable provider gateway and the first streaming provider gateway and the first streaming application do not know the second streaming key. The cable provider gateway pushes the second diff file through the consumer premises equipment to the local storage.

In one or more embodiments, the broker API receives an encrypted selection of the third media content from the second streaming application. The encrypted selection of the third media content is encrypted by the second streaming key, which the broker API does not know. The broker API matches the encrypted selection of the third media content to the second updated encrypted manifest in the local storage, retrieves the encrypted third media content from the local storage in response to the encrypted selection of the third media content, and delivers the encrypted third media content to the second streaming application via the LAN.

According to another aspect, a broker API and a streaming application implement methods 1900, 2200 for locally caching and displaying media content, as shown in FIGS. 11 and 15. The methods include implementing a broker Application Programming Interface (API) at a consumer premises equipment that includes a memory and a processor, connected in communication with a cable provider gateway, a first streaming provider gateway, a second streaming provider gateway, and a Local Area Network (LAN), and implementing a streaming application in the LAN. At 2204 the broker API retrieves from the storage device a first encrypted manifest of locally stored content, which is encrypted using a first streaming key. At 1914 the first streaming application receives a consumer selection of first content from a user via a first streaming application User Interface (UI), generates a first encrypted request by encrypting the consumer selection of first content using the first streaming key, and transmits the first encrypted request to the broker API. The broker API does not know the first streaming key. At 2202 the broker API receives the first encrypted request. At 2206 the broker API compares the first encrypted request to the first encrypted manifest. At 2208, in response to a match between the first encrypted request and the first encrypted manifest, the broker API retrieves from the storage device the first media content that is encrypted by the first streaming key. At 2210, the broker API delivers the encrypted first media content to the first streaming application. At 1916 the first streaming application receives the encrypted first media content and generates first content by decrypting the encrypted first media content using the first streaming key. At 1918, the first streaming application displays the first content to the user via the first streaming application UI.

In one or more embodiments, at 2205 the broker API delivers the first encrypted manifest to the first streaming application. At 1910, 1911 the first streaming application generates a first content listing by decrypting the first encrypted manifest using the first streaming key; at 1912, the first streaming application displays the first content listing to the user.

In one or more embodiments a second streaming application receives a consumer selection of second content via a second streaming application UI and generates a second encrypted content selection by encrypting the consumer selection of second content using a second streaming key. The broker API and the first streaming application do not know the second streaming key. The second streaming application transmits the second encrypted content selection by the second streaming application to the broker API. The broker API compares the second encrypted content selection to a second encrypted manifest that is encrypted by the second streaming key and, in response to the second encrypted content selection matching the second encrypted manifest, the broker API returns encrypted second content to the second streaming application. The second streaming application receives the encrypted second content from the broker API, generates second content by decrypting the encrypted second content using the second streaming key, and displays the second content to the user via the second streaming application UI.

According to another aspect, a system 1800 for caching and delivering media content from multiple streaming providers includes a storage device 1806 that implements a broker Application Programming Interface (API) 1804 and a display device 1801 that implements a streaming application 1800. The broker API 1804 is configured to: receive from the streaming application an encrypted request for first media content; retrieve from the storage device, a first encrypted manifest of locally stored content; compare the encrypted request to the first encrypted manifest, wherein the request and the first manifest both are encrypted by a first streaming key, which is known by the streaming application, but not known by the broker API; in response to a match between the encrypted request and the first encrypted manifest, retrieve from the storage device the first media content that is encrypted by the first streaming key; and deliver the encrypted first media content by the broker API to the first streaming application. The streaming application is configured to: receive a consumer selection of first content via a streaming application User Interface (UI); generate the encrypted request by encrypting the consumer selection of first content using the first streaming key; transmit the encrypted request to the broker API; receive, from the broker API, encrypted first media content that corresponds to the encrypted request; generate first content by decrypting the encrypted first media content using the first streaming key; and display the first content to the user via the streaming application UI.

System and Article of Manufacture Details

Figure 7:
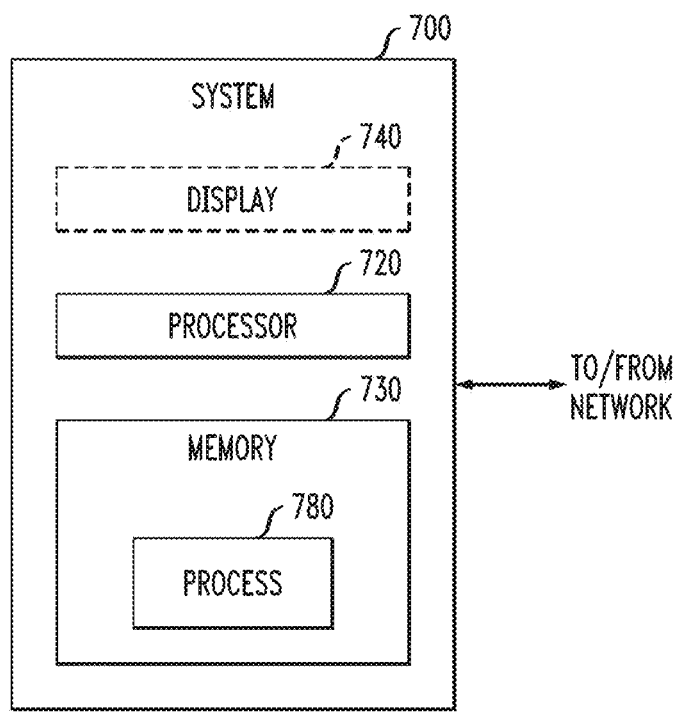
FIG. 7 is a block diagram of a computer system useful in connection with one or more aspects of the invention.

FIG. 7 is a block diagram of a system 700 that can implement at least some aspects of the invention, and is representative, for example, of one or more of the servers (and/or other elements with memory and processing capability) shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement the elements in FIGS. 10-13). The method steps can then be carried out using the distinct software modules of the system, as described above, executing on one or more hardware processors (e.g., a hardware processor or server located in the premises 106, head end 150, regional data center 1048 and/or national data center 1098). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A consumer premises equipment apparatus for facilitating caching and delivering media content from multiple streaming providers, configured for communication with a cable provider gateway, a first streaming provider gateway, a second streaming provider gateway, and a Local Area Network (LAN), the consumer premises equipment apparatus comprising:
   a memory; and
   at least one processor, coupled to the memory and operative to:
      implement a broker Application Programming Interface (API);
      receive, with the broker API, from a first streaming application implemented in the LAN, an encrypted request for first media content;
      retrieve, with the broker API, from a storage device, a first encrypted manifest of locally stored content;
      compare, with the broker API, the encrypted request to the first encrypted manifest, wherein the request and the first manifest both are encrypted by a first streaming key, which is known by the first streaming provider gateway and the first streaming application implemented in the LAN, but not known by the broker API, the second streaming provider gateway, the cable provider gateway, and a second streaming application;
      in response to a match between the encrypted request and the first encrypted manifest, retrieve, with the broker API, from the storage device, the first media content that is encrypted by the first streaming key; and
      deliver the encrypted first media content with the broker API to the first streaming application.

2. The consumer premises equipment apparatus of claim 1, wherein the at least one processor is further operative to:
   receive, with the broker API, from the second streaming application, a request for second media content that is encrypted by a second streaming key, which is known by the second streaming provider gateway and the second streaming application but not known by the broker API, the first streaming provider gateway, the first streaming application, and the cable provider gateway;
   retrieve, with the broker API, from the storage device, a second encrypted manifest that is encrypted by the second streaming key;
   compare, with the broker API, the encrypted request for the second media content to the second encrypted manifest;
   in response to a match between the encrypted request for the second media content and the second encrypted manifest, retrieve, with the broker API encrypted second media content corresponding to the encrypted request received from the second streaming application; and
   deliver the encrypted second media content, with the broker API, to the second streaming application.

3. The consumer premises equipment apparatus of claim 1, wherein the at least one processor is further operative to:

receive, with the broker API, from the first streaming application, an encrypted request for third media content, wherein the third request is encrypted by the first streaming key;

compare, with the broker API, the encrypted request for third media content to the first encrypted manifest; and in response to the encrypted request for third media content not matching the first encrypted manifest, return, with the broker API, to the first streaming application, a signal configured to cause the first streaming application to retrieve the third media content from the first streaming provider gateway.

4. A display device for facilitating caching and delivering media content from multiple streaming providers, the display device comprising:

a memory; and at least one processor, coupled to the memory and operative to:

implement a first streaming application having a first streaming application User Interface (UI);

receive a consumer selection of first content, with the first streaming application, from a user, via the first streaming application UI;

generate a first encrypted content selection, by the first streaming application encrypting the consumer selection of first content using a first streaming key;

transmit the first encrypted content selection, with the first streaming application, to a broker Application Programming Interface (API) that is implemented in a Local Area Network (LAN) in communication with the first streaming application, wherein the broker API does not know the first streaming key;

receive, by the first streaming application, from the broker API, encrypted first content corresponding to the first encrypted content selection, wherein the encrypted first content is encrypted by the first streaming key;

generate first content, by the first streaming application decrypting the encrypted first content using the first streaming key; and display the first content, with the first streaming application, to the user, via the first streaming application UI.

5. The display device of claim 4, wherein the at least one processor is further operative to confirm, using the first streaming application, that the broker API is enabled and to detect, using the first streaming application, the broker API.

6. The display device of claim 5, wherein the at least one processor is further operative to retrieve, using the first streaming application, an encrypted manifest from the broker API.

7. The display device of claim 6, wherein the at least one processor is further operative to decrypt, using the first streaming application, the encrypted manifest, determine, using the first streaming application, a list of local content to display, and display, using the first streaming application, the list of local content to the user.

8. The display device of claim 4, wherein the at least one processor is further operative to, after displaying the first content, use the first streaming application to communicate to a first streaming provider gateway an instruction to delete the encrypted first content from local storage that is connected in communication with the broker API via the LAN.

9. The display device of claim 4, wherein the at least one processor is further operative to:

after receiving the consumer selection of first content, with the first streaming application, transmit to a first streaming provider gateway the first encrypted consumer selection; and with the first streaming application, receive from the first streaming provider gateway an encrypted list of second content that is related to the first content.

10. The display device of claim 4, wherein the at least one processor is further operative to:

implement a second streaming application having a second streaming application UI;

with the second streaming application UI, receive a consumer selection of second content;

with the second streaming application, generate a second encrypted content selection by encrypting the consumer selection of second content using a second streaming key, wherein the broker API and the first streaming application do not know the second streaming key;

with the second streaming application, transmit the second encrypted content selection to the broker API;

with the second streaming application, receive, from the broker API, encrypted second content corresponding to the second encrypted content selection, wherein the encrypted second content is encrypted by the second streaming key;

with the second streaming application, generate second content by decrypting the encrypted second content using the second streaming key; and with the second streaming application, display the second content to the user via the second streaming application UI.

11. A streaming provider gateway for proactively delivering media content to a subscriber streaming application, the streaming provider gateway comprising:

a memory; and at least one processor, coupled to the memory and operative to:

receive, from the subscriber streaming application, an encrypted selection of first media content to be consumed, wherein the selection is encrypted by a first streaming key, wherein the streaming provider gateway and the subscriber streaming application know the first streaming key;

encrypt the first media content by the first streaming key;

push the encrypted first media content from the streaming provider gateway to a cable provider gateway that does not know the first streaming key;

implement a recommendation engine to identify second media content corresponding to the first media content;

encrypt the second media content by the first streaming key; and push the encrypted second media content to the cable provider gateway before the subscriber streaming application requests it.

* * * * *